United States Patent Office 3,329,643
Patented July 4, 1967

3,329,643
POLYMERIC COMPOSITIONS PLASTICIZED WITH 2,2 - DIMETHYLALKYL ESTERS OF DIBASIC ACIDS
Hugh J. Hagemeyer, Jr., and Alden E. Blood, Longview, Tex., assignors to Eastman Kodak Company, Rochester, N.Y., a corporation of New Jersey
No Drawing. Filed Nov. 15, 1965, Ser. No. 507,689
13 Claims. (Cl. 260—31.8)

This application is a continuation in part of our application Ser. No. 237, 295 filed Nov. 13, 1962, and now abandoned.

This invention relates to new plastic compositions and more particularly to polymeric plastic compositions plasticized with 2,2-dimethylalkyl esters of certain dibasic acids.

The invention is based on our discovery that the ester compounds having the formula:

I. 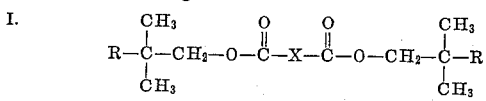

wherein R represents a straight chain alkyl radical having 2 to 8 carbon atoms and X represents phenylene or $(CH_2)_n$, wherein $n$ is a whole number from 4 to 8, have unexpected advantages as plasticizers for a number of different types of polymers, including vinyl and poly(methyl methacrylate) resins, and polyolefins, such as polypropylene, for example.

The diester compounds used in preparing the novel polymeric plastic compositions of the invention have superior hydrolytic, oxidative and heat stability and are compatible with a wide variety of dissimilar polymeric materials. This compatibility enables their superior properties to be put to use and results in improved polymeric plastic compositions.

The diester compounds appear to be especially useful in connection with polyvinyl chloride resins and when incorporated therein in plasticizing amount yield plasticized polyvinyl chloride compositions having excellent all-around properties with superior tensile strengths, elongations and 100% modulus. The ability of the aforementioned ester compounds to plasticize polypropylene results in polypropylene compositions having a lower brittleness temperature.

The plasticizer compounds employed by us are diesters of certain dibasic acids which have been esterified by the primary monohydric alcohols identified hereinafter. The dibasic acids need not be esterified with only one alcohol, but can be esterified with two different alcohols—provided both alcohols satisfy the criteria set forth hereinafter.

The acids from which the diester plasticizer compounds are prepared are saturated aliphatic dicarboxylic acids containing from 6 to 10 carbon atoms and benzene dicarboxylic acids. Adipic acid, pimelic acid, azelaic acid, suberic acid, sebacic acid, phthalic acid and isophthalic acid are examples of suitable acids for the formation of the diester compounds of the invention.

The primary monohydric alcohols used in the preparation of the diester plasticizer compounds have the formula:

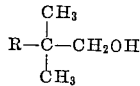

wherein R represents a straight chain alkyl radical having 2 to 8 carbon atoms. These alcohols are characterized in that the carbon atom in the β-position, i.e. the carbon atom adjacent to the carbinol (—$CH_2OH$) group, is a quaternary carbon atom, 2,2-dimethyl-1-butanol, 2,2-dimethyl-1-pentanol, 2,2-dimethyl-1-hexanol, 2,2-dimethyl-1-octanol and 2,2-dimethyl-1-decanol are examples of the primary monohydric alcohols used in the preparation of the diester plasticizer compounds.

Many of the diester plasticizer compounds of the invention are disclosed in French Patent 1,230,105. However, this patent does not disclose their utility as plasticizers and so far as we are aware the prior art contains no disclosure of our novel polymeric plastic compositions.

The diester plasticizer compounds are prepared using known esterification procedures. The preparation of a number of the plasticizer compounds is disclosed in French Patent 1,230,105.

The following examples illustrate the invention.

*Example 1.—Bis(2,2-dimethylbutyl) phthalate*

To a 3-liter, 3-neck flask equipped with a Dean and Stark tube, condenser, and thermowell were added 1224 grams of 2,2-dimethylbutanol (12 moles), 592 grams of phthalic anhydride (4 moles), 100 ml. of benzene, and 3.5 grams of p-toluene sulfonic acid. The resulting mixture was heated at reflux removing the water in the Dean and Stark tube as it formed. After a three-hour period a total of 72 ml. of water was collected (theory 72 ml.). Distillation gave 1307 grams of bis(2,2-dimethylbutyl) phthalate (97.9 percent of theory). The product boiled at 174.5° C./1 mm. The index of refraction (25° C./D) was 1.4874, and the specific gravity (20° C./20° C.) was 1.011.

*Example 2.—Bis(2,2-dimethylhexyl) phthalate*

Example 1 was repeated using 1560 grams of 2,2-dimethyl-1-hexanol in place of 2,2-dimethyl-1-butanol. The bis(2,2-dimethylhexyl) phthalate obtained had a boiling point of 230° C./8 mm., a specific gravity of 0.9817 (20° C./20° C.) and an index of refraction of 1.4857 (25° C./D).

*Example 3.—Bis(2,2-dimethyloctyl) phthalate*

This ester was prepared in accordance with the procedure of Example 1 using an equivalent amount of 2,2-dimethyl-1-octanol in place of 2,2-dimethyl-1-butanol. The bis(2,2-dimethyloctyl) phthalate obtained boiled at 239° C./3 mm., had a specific gravity of 0.9663 (20° C./20° C.) and an index of refraction of 1.4811 (25° C./D).

*Example 4.—Bis(2,2-dimethyldecyl) phthalate*

This ester was prepared in accordance with the procedure of Example 1 using an equivalent amount of 2,2-dimethyldecanol in place of 2,2-dimethyl-1-butanol. The bis(2,2-dimethyldecyl) phthalate boiled at 242° C./0.3 mm. and had a specific gravity of 0.9751 (20° C./20° C.).

*Example 5.—Bis(2,2-dimethyloctyl) adipate*

This ester was prepared in accordance with the general procedure described in Example 1 using equivalent amounts of 2,2-dimethyl-1-octanol (12 moles) and adipic acid (4 moles), in place of 2,2-dimethyl-1-butanol and phthalic anhydride, respectively. The bis(2,2-dimethyloctyl) adipate obtained boiled at 216° C./4 mm.

*Example 6.—Bis(2,2-dimethyloctyl) azelate*

This ester was prepared in accordance with the general procedure described in Example 1 using equivalent amounts of 2,2-dimethyl-1-octanol and azelaic acid in place of 2,2-dimethyl-1-butanol and phthalic anhydride, respectively. The bis(2,2-dimethyloctyl) azelate obtained boiled above 275° C./2 mm. and had a specific gravity of 0.9058 (20° C./20° C.).

*Example 7.—Bis(2,2-dimethyloctyl) sebacate*

This ester was prepared in accordance with the general procedure described in Example 1 using equivalent amounts of 2,2-dimethyl-1-octanol and sebacic acid in place of 2,2-dimethyl-1-butanol and phthalic anhydride, respectively. The bis(2,2-dimethyloctyl) sebacate obtained boiled above 277° C./2 mm. and had a specific gravity of 0.9000 (20° C./20° C.).

The other diester plasticizer compounds employed in the plasticized compositions of our invention can be prepared in accordance with the general procedures described in Examples 1 to 7, inclusive. Other diester compounds that can be prepared include bis(2,2-dimethylbutyl) adipate,
bis(2,2-dimethylpentyl) adipate,
bis(2,2-dimethylhexyl) adipate,
bis(2,2-dimethyldecyl) adipate,
bis(2,2-dimethylbutyl) azelate,
bis(2,2-dimethylpentyl) azelate,
bis(2,2-dimethylhexyl) azelate,
bis(2,2-dimethyldecyl) azelate,
bis(2,2-dimethylbutyl) sebacate,
bis(2,2-dimethylpentyl) sebacate,
bis(2,2-dimethylhexyl) sebacate,
bis(2,2-dimethyldecyl) sebacate,
bis(2,2-dimethylpentyl) phthalate,
bis(2,2-dimethylbutyl) pimelate,
bis(2,2-dimethylpentyl) pimelate,
bis(2,2-dimethylhexyl) pimelate,
bis(2,2-dimethyloctyl) pimelate,
bis(2,2-dimethyldecyl) pimelate,
bis(2,2-dimethylbutyl) suberate,
bis(2,2-dimethylpentyl) suberate,
bis(2,2-dimethylhexyl) suberate,
bis(2,2-dimethyloctyl) suberate,
bis(2,2-dimethyldecyl) suberate,
bis(2,2-dimethylbutyl) isophthalate,
bis(2,2-dimethylpentyl) isophthalate,
bis(2,2-dimethylhexyl) isophthalate,
bis(2,2-dimethyloctyl) isothalate and
bis(2,2-dimethyldecyl) isophthalate, for example.

Table I shows the improved resistance to hydrolysis exhibited by bis(2,2-dimethylhexyl) phthalate. Improved resistance to hydrolysis is characteristic of the diester plasticizer compounds employed by us in the novel useful plasticized compositions of our invention. This property makes the diester plasticizer compounds valuable in applications where hydrolytic conditions are met. The comparisons shown are for hydrolysis of the ester in 0.5 N potassium hydroxide-ethanol solution.

TABLE I.—COMPARATIVE HYDROLYTIC STABILITY (IN 0.5 N KOH/EtOH)

| Ester | Percent Hydrolyzed In— | | |
|---|---|---|---|
| | 20 min. | 40 min. | 200 min. |
| Bis(2,2-dimethylhexyl) phthalate | 19 | 36 | 80 |
| Bis(2-ethylhexyl) phthalate | 36 | 53 | 99 |
| Bis(n-octyl) phthalate | 53 | 74 | 100 |
| Bis(n-nonyl) phthalate | 47 | 68 | 100 |

Table II gives the physical properties of various diester plasticizer compounds used in preparing the valuable plasticized compositions of our invention.

TABLE II.—PHYSICAL PROPERTIES OF 2,2-DIMETHYLALKYL ESTERS

| Ester | B.P.* (° C.) | $N_D^{25}$ | Sp. Gr. (20° C./20° C.) | % Hydrolysis (96 Hours Boiling $H_2O$) |
|---|---|---|---|---|
| Bis(2,2-dimethylbutyl) adipate | 331 | 1.4389 | 0.9391 | 0.15 |
| Bis(2,2-dimethylhexyl) adipate | 358 | 1.4420 | 0.9223 | 0.07 |
| Bis(2,2-dimethyloctyl) adipate | 383 | 1.4445 | 0.9100 | 0.0 |
| Bis(2,2-dimethyldecyl) adipate | 410 | 1.4475 | 0.8950 | 0.0 |
| Bis(2,3-dimethylbutyl) azelate | 359 | 1.4429 | 0.9279 | 0.08 |
| Bis(2,2-dimethylhexyl) azelate | 370 | 1.4464 | 0.9173 | 0.0 |
| Bis(2,2-dimethyloctyl) azelate | 387 | 1.4475 | 0.9061 | 0.0 |
| Bis(2,2-dimethyldecyl) azelate | 392 | 1.4510 | 0.8997 | 0.0 |
| Bis(2,2-dimethylhexyl) sebacate | 165/0.01 mm. | 1.4488 | 0.9134 | 0.0 |
| Bis(2,2-dimethyloctyl) sebacate | 191/0.01 mm. | 1.4456 | 0.9000 | 0.0 |
| Bis(2,2-dimethylbutyl) phthalate | 266 | 1.4874 | 1.011 | 0.0 |
| Bis(2,2-dimethylhexyl) phthalate | 303 | 1.4857 | 0.9817 | 0.0 |
| Bis(2,2-dimethyloctyl) phthalate | 239/3 mm. | 1.4811 | 0.9525 | 0.0 |
| Bis(2,2-dimethyldecyl) phthalate | 242/0.3 mm. | 1.4749 | 0.9228 | 0.0 |

*Boiling points are extrapolated to or are measured at 760 mm. unless otherwise noted.

Tables III, IV and V give the properties of numerous plasticized polyvinyl chloride compositions of our invention. Additionally, some polyvinyl chloride compositions plasticized with known polyvinyl chloride plasticizers are included for comparative purposes.

TABLE III.—PROPERTIES OF POLYVINYL CHLORIDE PLASTICIZED WITH VARIOUS ESTERS [1]

| Property | Bis(2,2-dimethylbutyl) phthalate | Bis(2,2-dimethylhexyl) phthalate | Bis(2,2-dimethyloctyl) phthalate | Bis(2,2-dimethyldecyl) phthalate | (2,2-dimethylbutyl-2,2-dimethyloctyl) phthalate [2] | Bis(2,2-dimethylhexyl) isophthalate | Di(2-ethylhexyl) phthalate |
|---|---|---|---|---|---|---|---|
| Tensile Strength, p.s.i. | 3,000 | 3,050 | 2,950 | 2,700 | 3,100 | 3,050 | 3,100 |
| Ultimate Elongation, percent | 310 | 315 | 330 | 300 | 340 | 325 | 375 |
| 100% Modulus, p.s.i. | 2,400 | 2,050 | 1,850 | 2,400 | 1,850 | 2,250 | 1,525 |
| Elongation Retention, percent | 0 | 0 | 53 | 110 | 0 | 0 | 43 |
| Tear Resistance, p.p.i. | 570 | 475 | 465 | 500 | 450 | 480 | 385 |
| Shore "A" Durometer Hardness, 5 sec. | 91 | 87 | 89 | 90 | 83 | 90 | 85 |
| Soapy Water Extraction, percent | 0.6 | 0.3 | 0.04 | 0.01 | 1.8 | 0.2 | 0.4 |
| Heptane Extraction, percent | 19 | 24 | 26 | 28 | 23 | 23 | 23.5 |
| Activated Carbon Loss, percent | 6.7 | 1.6 | 0.3 | 0.1 | 5.5 | 1.1 | 1.3 |
| Thickness, mils | 8.0 | 14 | 8.5 | 11 | 8.5 | 12 | 10 |
| Torsion Modulus, ° C.: | | | | | | | |
| 35,000 p.s.i. | 3.0 | −15 | −18 | −25 | −20 | −18 | −26 |
| 135,000 p.s.i. | −20 | −40 | −45 | −50 | −40 | −48 | −53 |
| Accelerated Weathering: | | | | | | | |
| Hand | 1/1 | 1/0 | 0/0 | 0/0 | 1/0 | 0/0 | |
| Color | 1/0 | 2/0 | 1/0 | 1/0 | 1/0 | 1/0 | |
| Exudation | 0/0 | 1/0 | 1/0 | 1/0 | 1/0 | 0/0 | |

[1] Formulation: 100 parts of polyvinyl chloride resin (Geon 101 EP) 2 parts Ba-Cd stabilizer, 2 parts epoxy stabilizer, 50 parts of plasticizer (as indicated). Parts are expressed as parts by weight.
[2] A diester having two different ester groups.

TABLE IV.—PROPERTIES OF POLYVINYL CHLORIDE PLASTICIZED WITH 2,2-DIMETHYLALKANOL ESTERS OF DIBASIC ACIDS [1]

| Ester | Bis(2,2-dimethyl-hexyl) adipate | Bis(2,2-dimethyl-butyl) azelate | Bis(2,2-dimethyl-hexyl) azelate | Bis(2,2-dimethyl-octyl) azelate | Bis(2,2-dimethyl-hexyl) sebacate |
|---|---|---|---|---|---|
| Tensile Strength, p.s.i. | 2,650 | 2,850 | 2,700 | 2,050 | 2,700 |
| Ultimate Elongation, percent | 1,250 | 1,150 | 1,350 | 1,400 | 1,300 |
| 100% Modulus, p.s.i. | 385 | 390 | 430 | 240 | 390 |
| Elongation Retention, percent | 0 | 0 | 0 | 102 | 36 |
| Tear Resistance, p.p.i. | 365 | 310 | 355 | 160 | 360 |
| Shore "A" Durometer Hardness, 5 sec. | 80 | 80 | 83 | 95 | 84 |
| Soapy Water Extraction, percent | 1.8 | 2.2 | 0.9 | 2.7 | 0.2 |
| Heptane Extraction, percent | 25 | 22 | 26 | 34 | 28 |
| Activated Carbon Loss, percent | 6.0 | 6.5 | 3.9 | 4.0 | 0.8 |
| Thickness, mils | 11 | 9.0 | 8 | 13 | 14 |
| Torsion Modulus, °C.: | | | | | |
| 35,000 p.s.i. | −43 | −36 | −45 | −47 | −50 |
| 135,000 p.s.i. | <−60 | −61 | <−60 | <−60 | <−60 |
| Accelerated Weathering: | | | | | |
| Hand | 1/0 | 0/0 | 0/0 | 2/1 | 0/0 |
| Color | 1/0 | 1/0 | 1/0 | 2/1 | 1/0 |
| Exudation | 1/0 | 1/0 | 1/0 | 2/0 | 1/0 |

[1] Formulation: 100 Parts of polyvinyl chloride resin (Geon 101 EP), 2 parts Ba-Cd stabilizer, 2 parts epoxy stabilizer, 50 parts of plasticizer (as indicated). Parts are expressed as parts by weight.

TABLE V.—COMPARATIVE PROPERTIES OF PLASTICIZED POLYVINYL CHLORIDE

| | Plasticizers Used [1] (50 Phr. [2]) | Tensile Strength (psi.) | Elongation (Percent) | 100% Modulus (psi.) |
|---|---|---|---|---|
| (1) | Diisooctyl phthalate | 3,025 | 290 | 2,035 |
| (2) | Bis(2,2-dimethylhexyl) phthalate | 3,050 | 315 | 2,050 |
| (3) | Didecyl phthalate | 2,925 | 280 | 2,105 |
| (4) | Bis(2,2-dimethyloctyl) phthalate | 2,950 | 330 | 1,850 |
| (5) | Diisooctyl adipate | 2,735 | 325 | 1,550 |
| (6) | Bis(2,2-dimethylhexyl) adipate | 2,650 | 385 | 1,250 |
| (7) | Diisooctyl azelate | 2,615 | 255 | 1,710 |
| (8) | Bis(2,2-Dimethylhexyl) azelate | 2,700 | 430 | 1,350 |
| (9) | Didecyl azelate | ([3]) | ([3]) | ([3]) |
| (10) | Bis(2,2-dimethyloctyl) azelate | 2,050 | 240 | 1,400 |
| (11) | Diisooctyl sebacate | 2,220 | 220 | 1,570 |
| (12) | Bis(2,2-dimethylhexyl) sebacate | 2,700 | 390 | 1,300 |

[1] The data on the plasticizers numbered (1), (3), (5), (7), (9) and (11) were taken from "Higher Oxo Alcohols," Enjay Company, Inc., New York 19, New York, 1957, p. 53. Isooctyl alcohol is a mixture of 3,4-dimethyl-1-hexanol 20%, 3,5-dimethyl-1-hexanol 30%, 4,5-dimethyl 30%, methylheptanols 15% (3-methyl-1-heptanol and 5-methyl-1-heptanol) and 5% of unidentified alcohols. "Decyl alcohol contains predominantly the isomeric trimethylheptanols, and there are no compounds with a quaternary carbon atom." Ibid, p. 33.
[2] Phr. means parts by weight per 100 parts of resin.
[3] Too incompatible.

TABLE VI.—HEAT STABILITY OF PLASTICIZED PVC1 WIRE COATINGS [1] (WITHOUT BISPHENOL A)

| Plasticizer | Retained Percent Elongation After 7 days at 90° C. |
|---|---|
| Diisodecyl phthalate | 20 |
| Bis(2,2-dimethyloctyl) phthalate | 56 |

[1] Composition: 100 parts Geon 101 EP (polyvinyl chloride), 7 parts clay filler, 10 parts Dythal (dibasic lead phthalate), 60 parts plasticizer. Parts are by weight.

TABLE VII.—PROPERTIES OF POLYPROPYLENE PLASTICIZED WITH 10% BY WEIGHT OF BIS(2,2-DIMETHYLDECYL) ADIPATE

| | Polypropylene | Plasticized Polypropylene |
|---|---|---|
| Tensile Strength, p.s.i. at yield | 4,460 | 3,460 |
| Stiffness in Flexure, p.s.i. | 132,000 | 100,800 |
| Brittleness Temperature, °C. | +18 | −18 |
| Vicat Softening Point, °C. | 145 | 141.0 |

As indicated hereinbefore, the diester plasticizers having the Formula I are compatible with a variety of polymers. While they are especially useful in connection with poly(vinyl chloride) polymers and while their utility and unique properties have been demonstrated with reference to poly(vinyl chloride) polymers they have utility when used as plasticizers for other types of polymers.

Amongst the resins which may be plasticized may be mentioned vinyl chloride homopolymers, and vinyl chloride copolymers containing a minor proportion of vinyl acetate, vinylidene chloride, alkyl maleates, acrylonitrile and alkyl acrylates, although this list is not to be regarded as limiting with regard to comonomers.

The diester plasticizer compounds are compatible with poly(methyl methacrylate) resins. For example, 20 weight percent (based on final polymer composition) of a phthalate ester made by reacting phthalic anhydride and an equal weight mixture of 2,2-dimethylbutanol and 2,2-dimethylhexanol was blended with a 35 percent solution of poly(methyl methacrylate) (I.V. 0.18) in isobutyl acetate. A pour film was prepared from the mixture and dried. The resulting film was perfectly clear and had superior flexibility compared to the unplasticized material.

The diester compounds having the Formula I are also compatible with polyolefins. For example, 10 weight percent of bis(2,2-dimethyldecyl) adipate was blended with polypropylene using mill rolls. The plasticizer struck in the polypropylene very rapidly to give a smooth composition with no evidence of incompatibility. As much as 20 percent of bis(2,2-dimethyldecyl) phthalate has been blended into polypropylene with no evidence of incompatibility. These compositions retain their flexibility. Plasticizers such as the Oxo derived diisooctyl phthalate or diisohexyl adipate show signs of incompatibility in polypropylene and the compositions are brittle. The properties of the bis(2,2-dimethyldecyl) adipate-polypropylene composition are shown in Table VII compared to the original polypropylene.

The tabulations given hereinbefore show the superior properties of the diester plasticizers having the Formula I. Superior hydrolytic stability, superior compatibility, superior heat and oxidative stability and superior tensile strength, for example have been shown. The superior heat and oxidative stability is shown in Table VI by comparing the retained percent elongation after 7 days in a 90° C. oven of a poly(vinyl chloride) wire coating composition plasticized with an Oxo derived diisodecyl phthalate ester and a poly(vinyl chloride) wire coating composition plasticized with bis(2,2-dimethyloctyl) phthalate. The latter composition retains almost 3 times more elongation.

A good poly(vinyl chloride) plasticizer should give the plasticized poly(vinyl chloride) composition a high tensile strength, a low modulus and a high elongation. These are three of the most important properties measured on plasticized compositions. These three properties are compared in Table V between the diester compounds having the Formula I and other branched chain esters derived from Oxo alcohols. The comparisons show that the diesters having the Formula I give higher tensile strength (in all but one case), higher elongations in all cases and a lower 100% modulus in all but one case. The higher elongations and the lower 100% modulus show the diester compounds having Formula I have greater compatibility for poly(vinyl chloride) resins than the esters derived from Oxo branched chain alcohols.

The amount of diester plasticizer incorporated with the polymer or resin can vary over a considerable range. The amount will vary with the particular polymer or resin employed. Thus the compatibility of the plasticizer with the polymer to be plasticized is a factor. As understood in the art, the plasticizer should be present in a plasticizing amount, that is, in an amount that imparts improved properties to the polymer. In general, the plasticizer should be present in an amount sufficient to improve the flexibility of the polymer or resin and can vary from about 20 to about 150 parts by weight per hundred parts by weight of resin. Preferably, the proportion of plasticizer is from about 40 to 100 parts per hundred parts of resin. These proportions apply particularly to poly(vinyl chloride) resins. The total amount of plasticizer within these ranges of proportion can comprise one or more diesters having the Formula I or a mixture of such a diester with one or more other types of plasticizers such as di(2-ethylhexyl) phthalate, dibutyl phthalate, tricresyl phosphate and the like.

Poly(vinyl chloride) compositions containing 50 percent by weight of the poly(vinyl chloride) resin of a diester plasticizer having the Formula I and wherein all or essentially all the plasticizer present is a diester plasticizer having the Formula I are among the preferred compositions of our invention.

The invention has been described in considerable detail with particular reference to certain preferred embodiments thereof, but it will be understood that variations and modifications can be effected within the spirit and scope of the invention as described hereinabove, and as defined in the appended claims.

We claim:
1. A plasticized composition consisting essentially of a polymeric plastic substance selected from the group consisting of vinyl chloride homopolymers, copolymers of vinyl chloride and monoethylenically unsaturated monomers copolymerizable therewith and wherein the monoethylenically unsaturated monomer is in minor proportion, poly(methyl methacrylate) resins, and polypropylene and a plasticizing amount of a plasticizer having the formula:

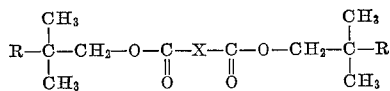

wherein R represents a straight chain alkyl radical having 2 to 8 carbon atoms and X represents a member selected from the class consisting of phenylene and $(CH_2)_n$, wherein $n$ is a whole number from 4 to 8.

2. A plasticized composition in accordance with claim 1 wherein the polymeric plastic substance is selected from the group consisting of vinyl chloride homopolymers and copolymers of vinyl chloride and monoethylenically unsaturated monomers copolymerizable therewith and wherein the monoethylenically unsaturated monomer is in minor proportion and a plasticizing amount of a plasticizer having the formula set forth in claim 1.

3. The composition of claim 1 in which said plastic is polyproylene.

4. The composition of claim 1 in which said plastic is polymethylmethacrylate.

5. A plasticized composition consisting essentially of a vinyl chloride homopolymer and a plasticizing amount of a plasticizer having the formula:

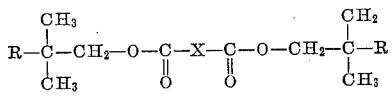

wherein R represents a straight chain alkyl radical having 2 to 8 carbon atoms and X represents a member selected from the class consisting of phenylene and $(CH_2)_n$, wherein $n$ is a whole number from 4 to 8.

6. A plasticized composition in accordance with claim 5 wherein the amount of plasticizer present is about 20 to about 150% by weight of the vinyl chloride homopolymer.

7. A plasticized composition in accordance with claim 5 wherein the plasticizer is bis (2,2-dimethylhexyl) adipate.

8. A plasticized composition in accordance with claim 5 wherein the plasticizer is bis (2,2-dimethyloctyl) adipate.

9. A plasticized composition in accordance with claim 5 wherein the plasticizer is bis (2,2-dimethyloctyl) azelate.

10. A plasticized composition in accordance with claim 5 wherein the plasticizer is bis (2,2-dimethyloctyl) phthalate.

11. A plasticized composition in accordance with claim 5 wherein the plasticizer is bis (2,2-dimethylhexyl) phthalate.

12. A plasticized composition in accordance with claim 5 wherein the plasticizer is a diester of (a) a saturated aliphatic dicarboxylic acid containing from 6 to 10 carbon atoms and (b) a saturated 2,2-dimethyl alkanol containing from 6 to 12 carbon atoms.

13. A plasticized composition in accordance with claim 5 wherein the plasticizer is a diester of (a) phthalic acid and (b) a saturated 2,2-dimethyl alkanol containing from 6 to 12 carbon atoms.

References Cited

UNITED STATES PATENTS

| | | | |
|---|---|---|---|
| 2,015,077 | 9/1935 | Lawson. | |
| 2,015,088 | 9/1935 | Reid. | |
| 2,325,951 | 8/1943 | Gresham | 260—31.8 XR |
| 2,575,011 | 11/1951 | Fraser | 260—31.8 |
| 2,699,434 | 1/1955 | Turck | 260—31.8 |
| 2,734,884 | 2/1956 | Smith et al. | |
| 2,758,975 | 8/1956 | Cottle et al. | 106—178 XR |
| 2,839,492 | 1/1958 | Caldwell et al. | 260—45.85 |
| 2,889,354 | 6/1959 | Blake et al. | 260—485 |
| 3,092,602 | 6/1963 | Wille et al. | 260—31.8 |
| 3,158,585 | 11/1964 | Kelso et al. | |
| 3,180,908 | 4/1965 | Essen et al. | 260—31.8 XR |
| 3,189,574 | 6/1965 | Rogers et al. | 260—31.8 |
| 3,210,404 | 10/1965 | Durr et al. | 260—485 |
| 3,218,289 | 11/1965 | Rowland. | |
| 3,224,995 | 12/1965 | De Pree | 260—31.8 X |

FOREIGN PATENTS

| | | |
|---|---|---|
| 1,230,105 | 9/1960 | France. |

ALEXANDER H. BRODMERKEL, *Primary Examiner.*

J. H. WOO, *Assistant Examiner.*